United States Patent [19]

Saitoh

[11] Patent Number: 5,598,228
[45] Date of Patent: Jan. 28, 1997

[54] CHANNEL SELECTION IN A DIGITAL TELEVISION RECEIVER

[75] Inventor: Mitsumasa Saitoh, Kanagawa, Japan

[73] Assignee: Sony Corporation, Tokyo, Japan

[21] Appl. No.: 302,606

[22] Filed: Sep. 8, 1994

[30] Foreign Application Priority Data

Sep. 8, 1993 [JP] Japan ........................... 5-222955

[51] Int. Cl.⁶ ........................................... H04N 5/44
[52] U.S. Cl. ............................... 348/732; 348/725
[58] Field of Search .......................... 348/725, 731, 348/732; 455/3.2

[56] References Cited

U.S. PATENT DOCUMENTS 4,360,832  11/1982  Rzeszewski ..................... 348/731
5,400,401  3/1995  Wasilewski ........................ 380/9

*Primary Examiner*—Victor R. Kostak
*Assistant Examiner*—Nathan J. Flynn
*Attorney, Agent, or Firm*—Limbach & Limbach LLP

[57] ABSTRACT

A channel selecting system for use in a television receiver arranged for receiving a television signal having digital data including digital video data and digital audio data. The broadcasting carrier of the received television signal is detected while changing a receive frequency. A check is made whether the digital data are locked in the vicinity of the receive frequency after the broadcasting carrier is detected.

8 Claims, 7 Drawing Sheets

FIG.3

| T-RATE [Mbps] | BW [MHz] | I-RATE [Mbps] | | | | | FF [Hz] |
|---|---|---|---|---|---|---|---|
| | | R=7/8 | R=5/6 | R=3/4 | R=2/3 | R=1/2 | |
| 49.152 | 32 | 43.008 | 40.96 | 36.864 | 32.768 | 24.576 | 500 |
| 24.576 | 16 | 21.504 | 20.48 | 18.432 | 16.384 | 12.288 | 250 |
| 12.288 | 8 | 10.752 | 10.24 | 9.216 | 8.192 | 6.144 | 125 |
| 6.144 | 4 | 5.376 | 5.12 | 4.608 | 4.096 | 3.072 | 62.5 |
| FW [bit] | | 168 | 160 | 144 | 128 | 96 | |
| RSR | | 0.93 | 0.925 | 0.92 | 0.91 | 0.875 | |

CHANNEL SELECTION IN A DIGITAL TELEVISION RECEIVER

BACKGROUND OF THE INVENTION

This invention relates to a channel selection system for use in a television receiver adapted to receive a full-digital television signal.

Although there is no satellite telecasting system adapted for full-digital television signals, such a system will be realized in the near future because of its desirable capacity of providing high-quality images regardless of rough weather with no requirement to change the transmission rate by increasing the redundancy so as to increase the error correction capacity. Since the full-digital television signal has no signal corresponding to the synchronizing signal included in analog television signals, however, it is the current practice to select a desired channel by checking whether or not the digital data are locked while repeating sweeping operations for all of the receive frequencies. This current channel selection requires much time.

SUMMARY OF THE INVENTION

It is a main object of the invention to provide an improved channel selection system which permits high-speed channel selection for full-digital television signals.

There is provided, in accordance with the invention, a channel selection system for use in a television receiver arranged for receiving a full-digital television signal having digital data including digital video data and digital audio data. The channel selecting system comprises means for detecting a broadcasting carrier of the received television signal while changing a receive frequency, and means for making a check whether the digital data are locked in the vicinity of the receive frequency after the broadcasting carrier is detected.

BRIEF DESCRIPTION OF THE DRAWINGS

The invention will be described in greater detail by reference to the following description taken in connection with the accompanying drawings, in which:

FIG. 3 is a table having various parameters listed for different values to which the transmission rate is switched;

DETAILED DESCRIPTION OF THE INVENTION

Figure 1:
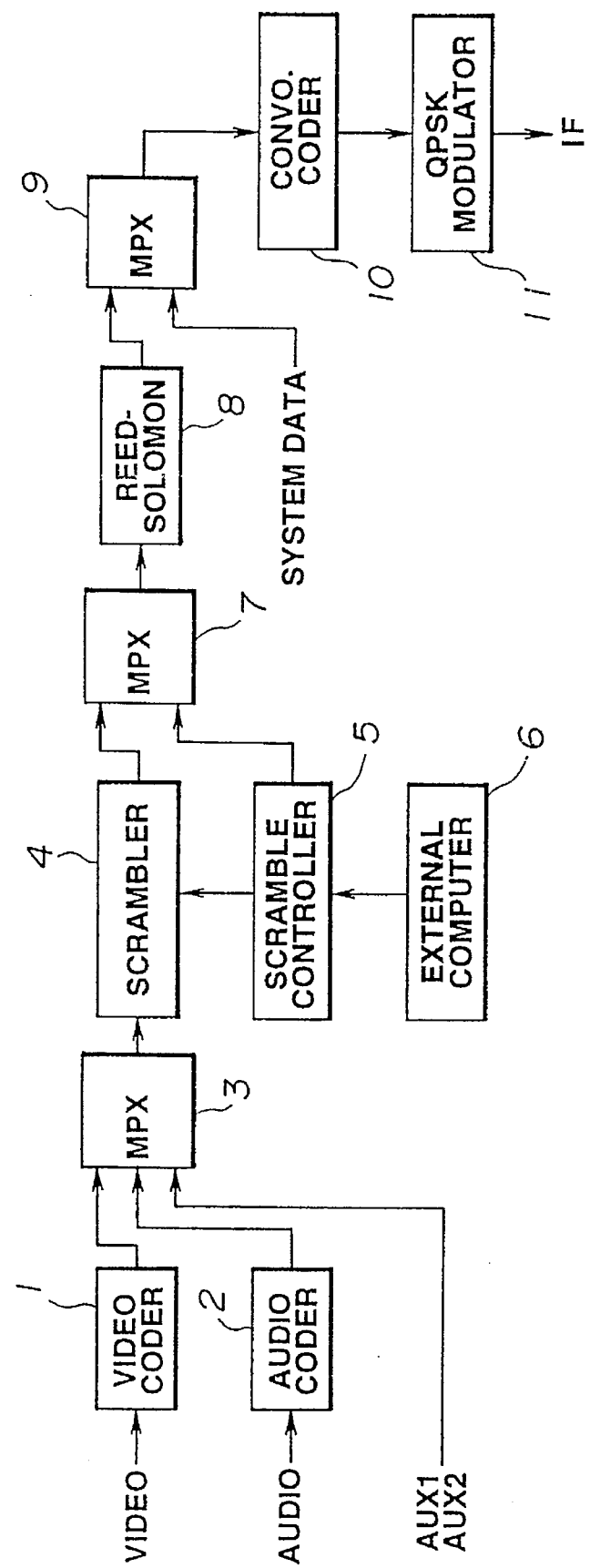
FIG. 1 is a schematic block diagram showing an encoder used in a television transmitter for use in a satellite telecasting system of the invention.

With reference to the drawings and in particular to FIG. 1, there is shown a schematic block diagram of an encoder included in a television transmitter for use in a satellite telecasting system. The encoder includes a video coder circuit 1 which receives digital video data and high-efficiency codes the received digital video data. The high-efficiency coded digital video data are fed from the video coder circuit 1 to a first multiplexer circuit 3. The encoder also includes an audio coder circuit 2 which receives digital audio data and high-efficiency codes the received digital audio data. The high-efficiency coded digital audio data are fed from the audio coder circuit 2 to the first multiplexer circuit 3. The first multiplexer circuit 3 multiplexes the high-efficiency coded digital video and audio data along with auxiliary digital data AUX1 and AUX2 fed thereto. The multiplexed digital data are fed from the first multiplexer circuit 3 to a scrambler circuit 4. The scrambler circuit 4 is associated with a scramble controller circuit 5 which operates on command from an external computer 6 to produce digital data on a scramble code and also digital data on a scramble key. The digital scramble code data are fed from the scramble controller circuit 5 to the scrambler circuit 4 which thereby scrambles the multiplexed digital data fed thereto from the first multiplexer circuit 3. The scrambled digital data are fed from the scrambler circuit 4 to a second multiplexer circuit 7. The second multiplexer circuit 7 receives the digital scramble key data from the scramble controller circuit 5 and multiples the digital scramble key data to the scrambled digital data to produce multiplexed digital data having a two-dimensional frame arrangement to be described later. The multiplexed digital data are fed from the second multiplexer circuit 7 to a Reed-Solomon coder circuit 8 which converts the received digital data into a Reed-Solomon coded form. The Reed-Solomon coded digital data are fed from the Reed-Solomon coder circuit 8 to a third multiplexer circuit 9. The third multiplexer circuit 9 also receives digital system data and multiplexes the digital system data to the Reed-Solomon coded digital data. The multiplexed digital data are fed from the third multiplexer circuit 9 to a convolutional coder circuit 10 which performs convolutional coding capable of changing the redundancy for the two-dimensional frame arrangement. The convolutional coded digital data are fed from the convolutional coder circuit 10 to a quarature phase shift keying (QPSK) modulator circuit 11 which modulates the received digital data to an intermediate frequency (IF) signal.

Figure 2:
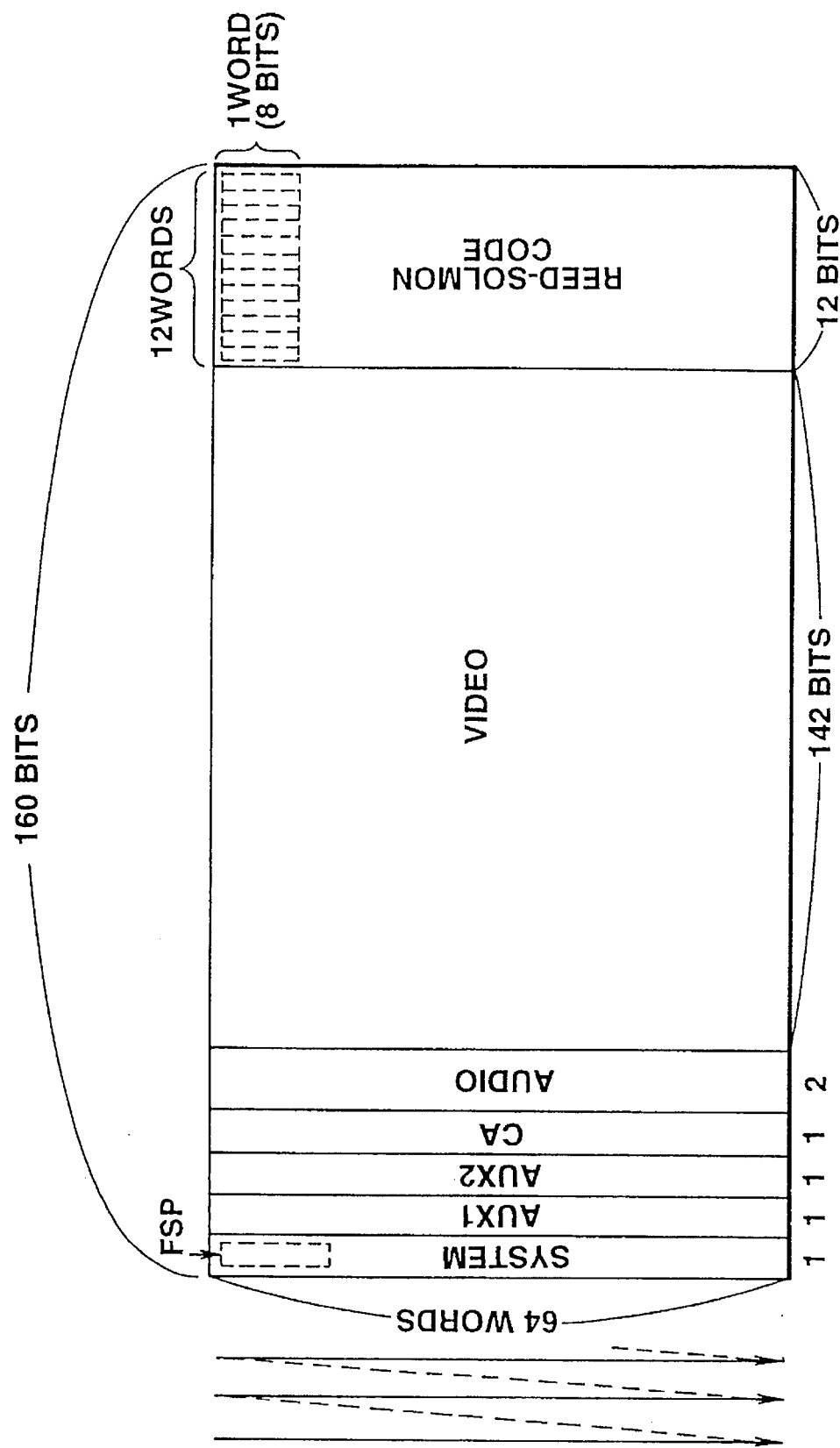
FIG. 2 is a schematic diagram showing one example of two-dimensional frame arrangement of the full-digital television signal of the invention.

Referring to FIG. 2, there is shown one example of two-dimensional frame arrangement of the intermediate frequency signal. In this case, a convolutional coding is made at a rate of 5/6 for the multiplexed digital data having an information rate of 40.96 Mbps and transmitted at a transmission rate of 49.152 Mbps. The two-dimensional frame has a width of 160 bits and a length of 64×8 bits. The frame frequency is 500 Hz. The two-dimensional frame, which is divided by longitudinal linear boundaries into a number of regions, includes a 1×64 word region (SYSTEM) assigned to the system data having a frame synchronization pattern (FSP), a 1×64 word region (AUX1) assigned to the first auxiliary data, a 1×64 word region (AUX2) assigned to the second auxiliary data, a 1×64 word region (CA) assigned to the scramble control data such as scramble key data and the like for conditional access, a 2×64 word region (AUDIO) assigned to the audio data, a 142×64 word region (VIDEO) assigned to the video data and a 12×64 word region (RSC) assigned to the 12 word Reed-Solomon code added for use in correcting transmission errors. The information rates of the video data, the audio data, the first auxiliary data, the second auxiliary data, the scramble control data, the system data, the Reed-Solomon code are 36.352 Mbps, 512 kbps, 256 kbps, 256 kbps, 256 kbps, 256 kbps and 3.072 Mbps, respectively.

The operation of the encoder of the invention is as follows. The video coder circuit 1 compression codes the digital video data inputted thereto to produce high-efficiency coded digital video data. The digital audio coder circuit 2 compression codes the digital audio data inputted thereto to produce high-efficiency coded digital audio data. The coded digital video and audio data are fed, along with the auxiliary digital data, to the first multiplexer circuit 3 which multiplexes the digital data inputted thereto in succession. The scrambler circuit 4 scrambles the multiplexed digital data fed thereto from the first multiplexer circuit 3 in accordance with a scramble code fed thereto from the scramble controller circuit 5. The scramble controller circuit 5 also produces scramble key data and provides it to the second multiplexer circuit 7 which multiplexes the scramble key data to the scrambled digital data fed thereto from the scrambler circuit 4 to produce multiplexed digital data having a two-dimensional frame arrangement. The scramble key data are utilized, in a television receiver used in the satellite telecasting system, to descramble the television signal. The conditional access can be controlled through the external computer 6 connected to the scramble controller circuit 5. The Reed-Solomon coder circuit 8 adds a 12 word Reed-Solomon code to the two-dimensional frame arrangement, as indicated by the broken lines of FIG. 2, for transmission error correction. The digital system data are added to the head of the digital data of the two-dimensional frame arrangement in the third multiplexer circuit 9. The frame synchronization pattern is a 32 bit pattern, for example, of 0000 0100 1001 0010 1010 1101 1100 1110. The television receiver utilizes this frame synchronization pattern to detect the two-dimensional frame. Each word has 8 bits in the direction of length of the two-dimensional frame and each of the code blocks arranged in the direction of width of the two-dimensional frame has 8×160 bits. Thus, the information rate is 160×64×8×500=40.96 Mbps.

The two-dimensional frame is scanned from top-to-bottom and from left-to-right and the scanned signal is fed from the third multiplexer circuit 9 to the convolutional coder circuit 10 where it is coded at a rate ⅚ to provide a redundancy to the multiplexed digital data to be transmitted. In the television receiver, for example, a viterbi decoding process is applied to the coded digital data to correct the transmission errors. The transmission rate, that is, the rate of the digital data outputted from the convolutional coder circuit 10, is 40.96÷⅚=49.152 Mbps. The coded digital data outputted from the convolutional coder circuit 10 are fed as a modulation signal to the QPSK modulator circuit 11 where a quadrature phase shift keying process is made to convert it into an intermediate frequency signal. The intermediate frequency signal is applied to a transmitter (not shown). It is to be understood that the two-dimensional frame arrangement is not limited in any way to the illustrated one and may be selected freely according to the transmission bandwidth and rate. For example, the system may be arranged to switch the transmission rate T-RATE in four steps, that is, 49.152, 24.576, 12.288 and 6.144, as shown in FIG. 3. The band width BW of the television transmitter, the information rate I-RATE, the frame frequency FF, the frame width FW and the Reed-Solomon rate RSR are listed for each of the four different transmission rates T-RATE. The transmission rate T-RATE is determined according to the band width BW. According to the invention, the information rate I-RATE is determined according to the convolutional coding rate as well as the transmission rate T-RATE. It is, therefore, possible to increase the transmission error correction capacity by switching the convolutional coding rate to a smaller value so as to increase the redundancy when the transmission quality is degraded. If the transmission quality is high, the convolutional coding rate will be maintained at a greater value so as to increase the information rate. The digital multiple data television signal is received through an antenna by a television receiver provided on the earth.

Figure 4:
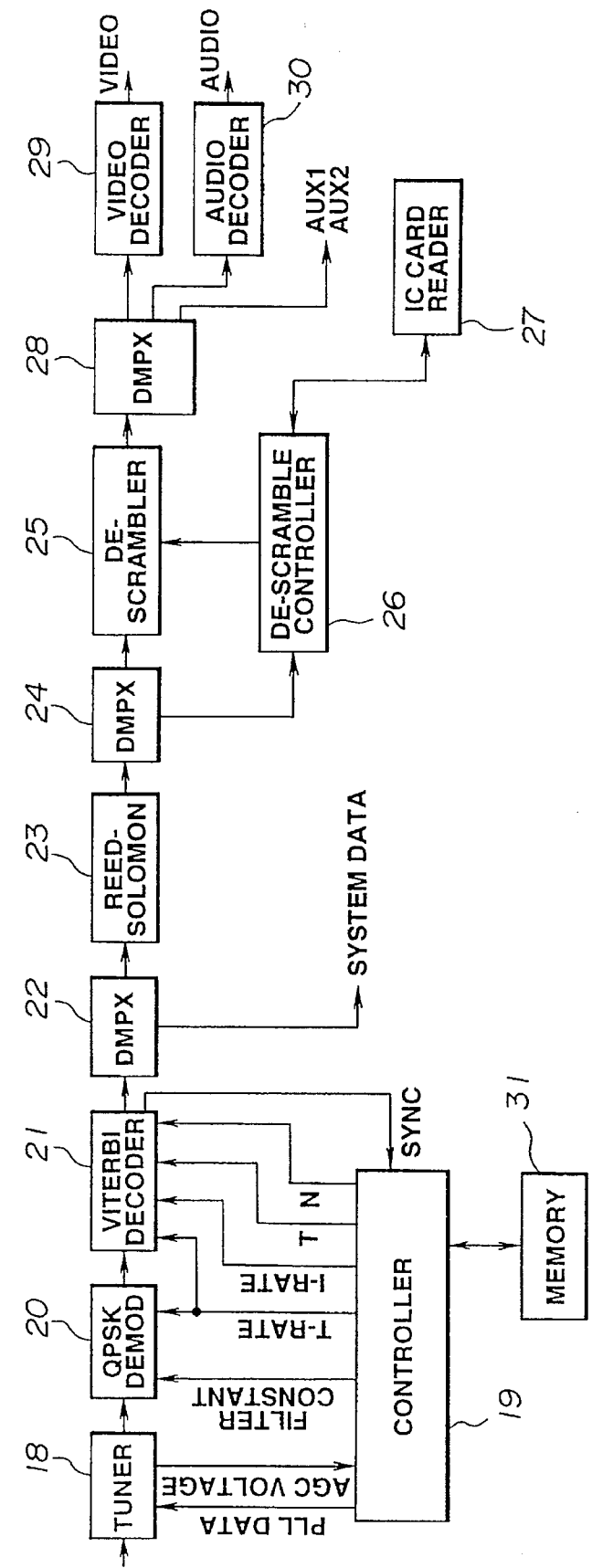
FIG. 4 is a schematic block diagram showing a television receiver for use in the satellite telecasting system of the invention.

Referring to FIG. 4, there is shown a schematic block diagram of a television receiver embodying the invention. The television receiver includes a tuner 18 connected to a television antenna for selecting an intermediate frequency signal for a desired channel. The tuner 18 includes an automatic gain control (AGC) circuit 46 (FIG. 5) which operates to maintain the input signal at a constant level regardless of the television antenna output level. The AGC circuit 46 produces an AGC voltage to a controller circuit 19. The tuner 18 also includes a phase-locked loop (PLL) channel selecting section 38 (FIG. 5) which receives PLL data fed thereto from the controller circuit 19. The controller circuit 19 is associated with a memory 31 which stores transmission-rate and information-rate data. The selected intermediate frequency signal is fed from the tuner 18 to a QPSK demodulator circuit 20 which demodulates the QPSK modulated intermediate frequency signal. The QPSK demodulator circuit 20 receives data on the filter constant from the controller circuit 19 and also data on the transmission rate. The demodulated signal is fed from the QPSK demodulator circuit 20 to a viterbi decoder circuit 21 which decodes the convolutional coded multiple digital data to correct the transmission errors. The viterbi decoder circuit 21 receives the transmission rate data, the information rate data, the time data (T) used for judgement of self-synchronization and the error number data (N) from the controller circuit 19. A synchronization flag (SYNC) is fed from the viterbi decoder circuit 21 to the controller circuit 19. The synchronization flag (SYNC) is cleared to zero when the digital data are locked or synchronized.

The decoded digital data are fed from the viterbi decoder circuit 21 to a first demultiplexer circuit 22 which separates the digital system data from the digital data of the two-dimensional frame arrangement. The demultiplexed digital data are fed from the first demultiplexer circuit 22 to a Reed-Solomon decoder circuit 23 where the convolutional coded multiple digital data are viterbi decoded to correct the transmission errors. The decoded digital data are fed from the Reed-Solomon decoder circuit 23 to a second demultiplexer circuit 24 where the scramble control data are separated. The separated scramble control data are fed to a descramble controller circuit 26 which utilizes the data stored in a user's IC card to produce a descramble code to a descrambler circuit 25. The descrambler circuit 25 receives the scrambled digital data from the second demultiplexer circuit 24 and descrambles the received digital data according to the descramble code fed there to from the descramble controller circuit 26. Normally, a pseudo noise (PN) code is used for the scramble code. The descrambled digital data are fed to a third demultiplexer circuit 28 which separates the received digital data into digital video data, digital audio data and digital auxiliary data. The digital video data are fed to a video decoder circuit 29 which decodes the receive data into the original video data. The digital audio data are fed to an audio decoder circuit 30 which decodes the received data into the original audio data.

Figure 5:
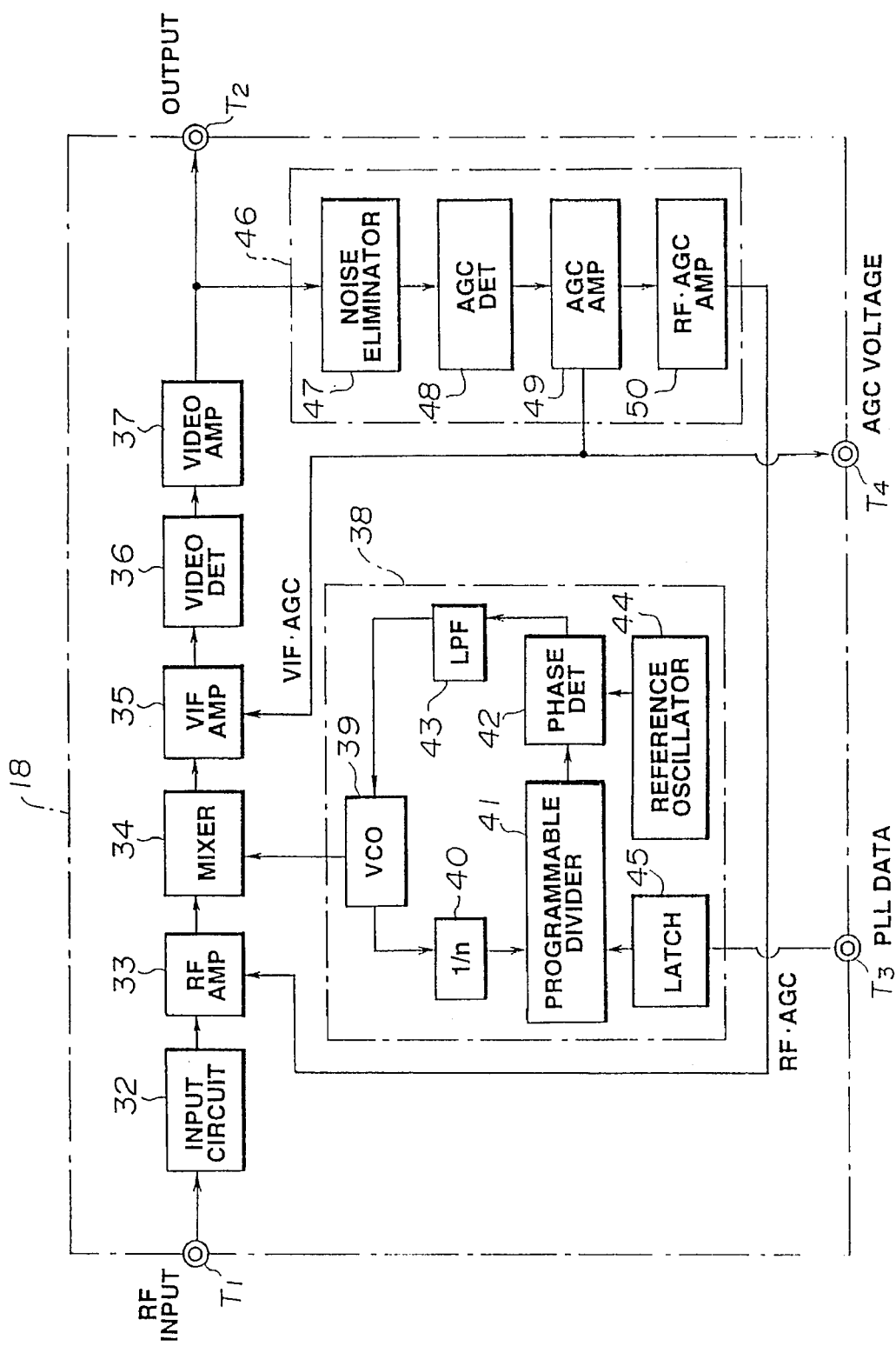
FIG. 5 is a schematic block diagram showing the detailed arrangement of the tuner used in the television receiver of FIG. 4.

Referring to FIG. 5, the tuner 18 includes an input circuit 32 having an input from an RF input terminal T1 at which a received signal appears. The input circuit 32 includes band path filters to remove disturbing waves. The filtered signal is applied through an RF amplifier circuit 33 to a mixer circuit 34 which mixes the input signal with a local oscillation signal fed thereto from a phase-locked loop (PLL) channel selecting section 38 to extract a video intermediate frequency signal. The video intermediate frequency signal is fed from the mixer circuit 34 through a VIF amplifier circuit 35 to a video detector circuit 36. The video detector circuit 36 detects the video intermediate frequency signal and extracts a baseband signal (signal before QPSK demodulation). The baseband signal is fed through a video amplifier circuit 37 to an output terminal T2.

The PLL channel selecting section 38 includes a phase-locked loop (PLL) comprised of a voltage-controlled oscillator circuit (VCO) 39, a 1/n frequency divider circuit 40, a programmable divider circuit 41, a phase detector circuit 42 and a low pass filter (LPF) 43. The frequency of the local oscillation signal from the voltage-controlled oscillator circuit 39 is divided by the 1/n frequency divider circuit 40 and the programmable divider circuit 41. The frequency-divided signal is fed to the phase detector circuit 41 which compares it with a reference oscillation signal fed thereto from a reference oscillator circuit 44 to produce an output. This output is fed through the low pass filter 43 to control the voltage-controlled oscillator circuit 39. The PLL channel selecting section 38 also includes a latch circuit 45 which receives PLL data fed to a PLL data terminal T3 from the controller circuit 19 (FIG. 4). The latch circuit 45 latches the PLL data and outputs the PLL data to the programmable divider circuit 41. The programmable divider circuit 41 varies the ratio at which the frequency of the signal is divided. This permits the voltage-controlled oscillator circuit 39 to produce a local oscillation signal having a desired frequency for the channel selecting operation.

The automatic gain control (AGC) section 46 includes a noise elimination circuit 47, an AGC detector circuit 48, an AGC amplifier circuit 49 and an RF-AGC amplifier circuit 50. The noise elimination circuit 47 receives the baseband signal fed thereto from the video amplifier circuit 37 and eliminates noises which may be superimposed on the baseband signal. The baseband signal is then fed from the noise elimination circuit 47 to the AGC detector circuit 48. The detected signal is fed from the AGC detector circuit 48 to the AGC amplifier circuit 49 which amplifies it. The amplified signal is fed back, as an AGC voltage, to the VIF amplifier circuit 35 and also to an AGC voltage terminal T4 which is connected to the controller 19 (FIG. 4). The amplified signal is also fed from the AGC amplifier circuit 49 to the RF·AGC amplifier circuit 50 which amplifies it. The amplified signal is fed back, as an RF·AGC voltage, from the RF·AGC amplifier circuit 50 to the RF amplifier circuit 33.

Figure 6:
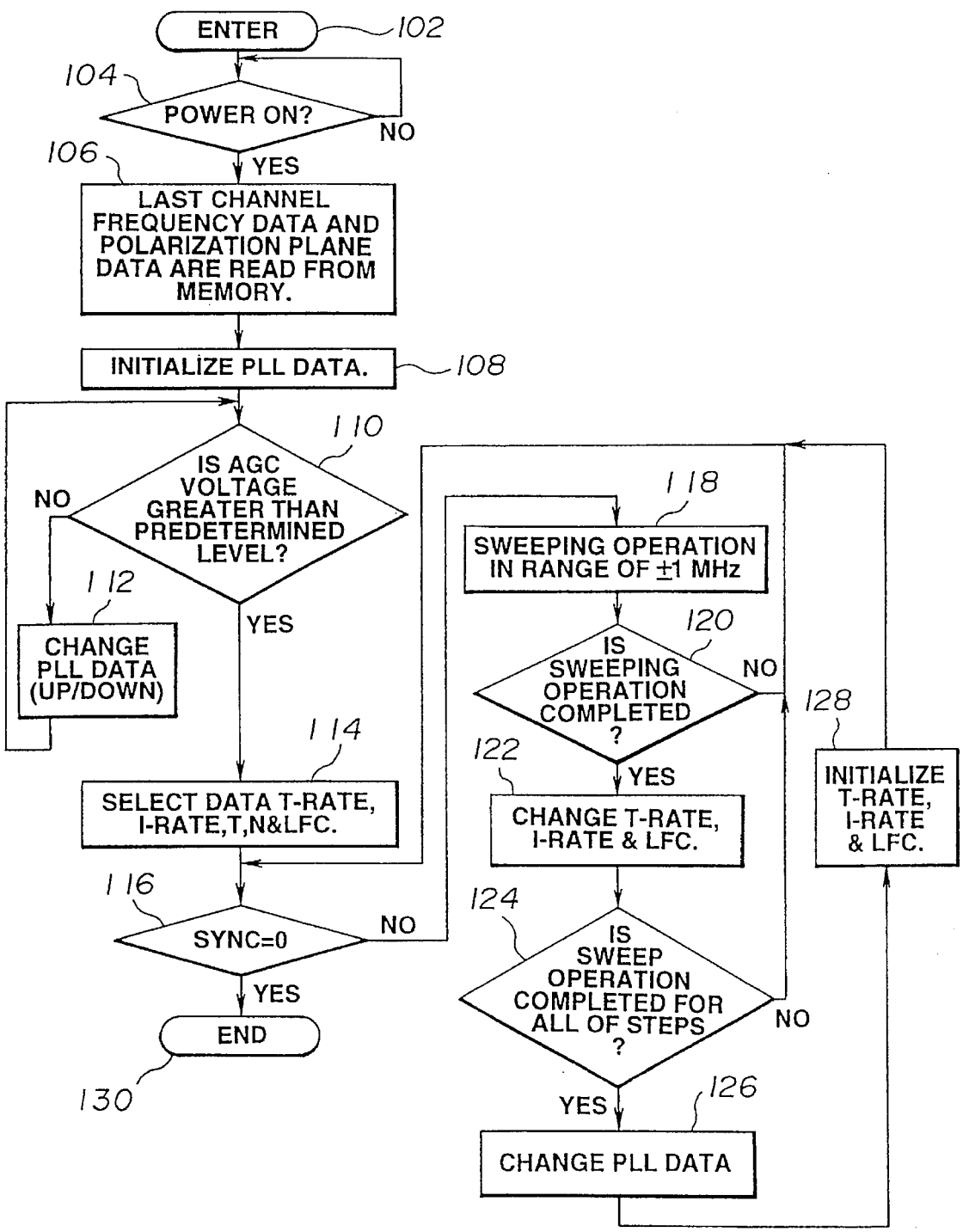
FIG. 6 is a flow diagram showing the programming of the digital computer as it is used for channel selection.

FIG. 6 is a flow diagram of the programming of the digital computer included in the controller circuit 19 (FIG. 4) as it is used for the channel selecting operation of the television receiver. The labels for each of the numbered elements in FIG. 6 are as follows:

```
102: ENTER
104: POWER ON ?
106: LAST CHANNEL FREQUENCY DATA AND
     POLARIZATION PLANE DATA
     ARE READ FROM MEMORY.
108: INITIALIZE PLL DATA.
110: IS AGC VOLTAGE GREATER THAN
     PREDETERMINED LEVEL ?
112: CHANGE PLL DATA. (UP/DOWN)
114: SELECT DATA T-RATE, I-RATE, T, N & LFC.
116: SYNC = 0
118: SWEEPING OPERATION IN RANGE OF ± 1 MHz.
```

-continued
```
120: IS SWEEPING OPERATION COMPLETED ?
122: CHANGE T-RATE, I-RATE & LFC.
124: IS SWEEP OPERATION COMPLETED FOR
     ALL OF STEPS ?
126: CHANGE PLL DATA
128: INITIALIZE T-RATE, I-RATE & LFC.
130: END
```

Referring to FIG. 6, the computer program is entered at the point 102. At the point 104 in the program, a determination is made as to whether or not the power is turned on. If the answer to this question is "YES", then the program proceeds to the point 106. Otherwise, the program is returned to the point 104.

At the point 106 in the program, last channel frequency data and polarization plane data are read from the memory 31. The last channel frequency data are used to initialize the PLL data at the point 108. Upon completion of the initialization, the program proceeds to a determination step at the point 110. This determination is as to whether or not the AGC voltage is greater than a predetermined level. If the answer to this question is "NO", then the program proceeds to the point 112 where the PLL data are changed up and down to change the receive frequency up and down and the program proceeds back to the point 110. Otherwise, it means that the receive frequency is in a frequency band where the broadcasting carrier exists and the program proceeds to the point 114. The frequency band has a center frequency fc which is the receive frequency measured when the AGC voltage reaches the predetermined level. At the point 114, appropriate transmission rate data T-RATE, information rate data I-RATE, loop filter constant data LFC, time data T used for judgement of self-synchronization and error number data N are selected. The selected transmission rate data T-RATE and loop filter constant data LFC are fed to the QFSK demodulator circuit 20. The selected transmission rate data T-RATE, information rate data I-RATE, time data T used for judgement of self-synchronization and error number data N are fed to the viterbi decoder circuit 21.

At the point 116 in the program, a determination is made as to whether or not the synchronization flag (SYNC) produced from the viterbi decoder circuit 21 is cleared to zero. If the answer to this question is "YES", then it means that the digital data are locked or synchronized and the program proceeds to the end point 130. Otherwise, the program proceeds to the point 118 where the PLL data are changed to sweep the receive frequency within a range from fc minus 1 MHz to fc plus 1 MHz. At the point 120 in the program, a determination is made as to whether or not the sweeping operation is completed. If the answer to this question is "YES", then the program proceeds to the point 122. Otherwise, the program proceeds to the point 116.

At the point 122 in the program, the transmission rate data T-RATE, the information rate data I-RATE, the loop filter constant data LFC are changed by one step. Upon completion of this operation, the program proceeds to a determination step at the point 124. This determination is as to whether or not the data T-RATE, I-RATE, LFC have been changed in all of the steps set therefor. If the answer to this question is "YES", then the program proceeds to the point 126. Otherwise, the program proceeds to the point 116. At the point 126 in the program, the PLL data are changed to change the center frequency fc. At the point 128 in the program, the transmission rate data T-RATE, the information rate data I-RATE, the loop filter constant data LFC are initialized. Following this, the program proceeds to the point 116.

According to the invention, the locked or synchronized condition of the digital data is checked again and again with transmission rate data T-RATE, the information rate data I-RATE and the loop filter constant data LFC increased in a predetermined number of steps set therefor. That is, a check is made whether or not the digital data are locked or synchronized while sweeping the receive frequency in a range of ±1 MHz around the center frequency fc. Upon completion of one sweeping operation in the range of ±1 MHz around the center frequency fc, the transmission rate data T-RATE, the information rate data I-RATE and the loop filter constant data LFC are increased by one step. A check is made again whether or not the digital data are locked or synchronized while sweeping the receive frequency in a range of ±1 MHz around the center frequency fc. This operation is repeated until the digital data are locked or synchronized. If the digital data are not locked or synchronized after the last cycle of the sweeping and checking operation, the PLL data are changed to change the center frequency fc. Similar operations are repeated for the changed center frequency fc. That is, the AGC voltage produced from the tuner 18 is checked to detect the broadcasting carrier.

Figure 7:
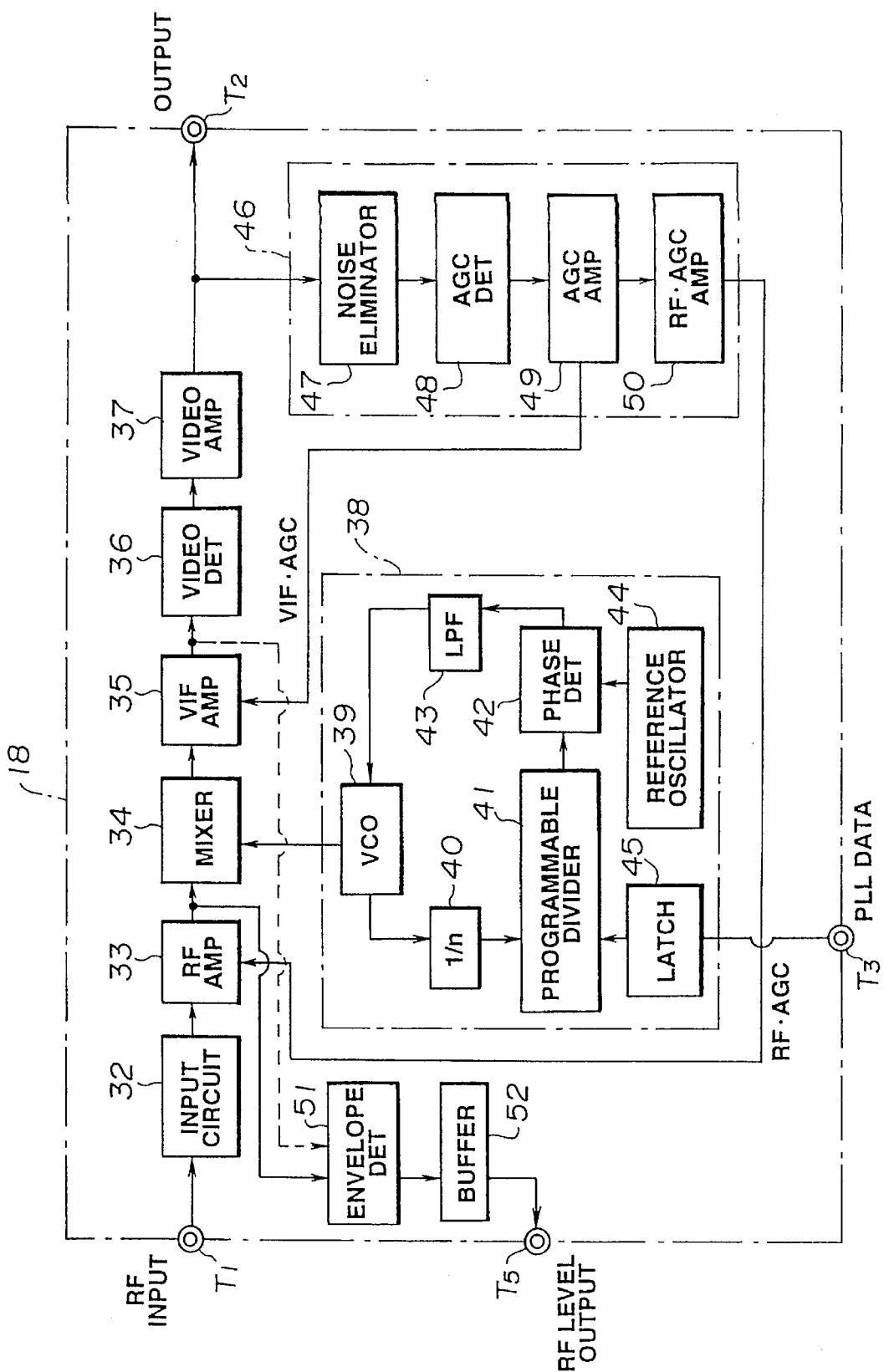
FIG. 7 is a schematic block diagram showing a modified form of the tuner used in the television receiver of FIG. 4.

Alternatively, the RF level of the received signal may be checked to detect the AGC voltage produced from the tuner 18. In this case, the tuner 18 is arranged, as shown in FIG. 7. This arrangement is substantially the same as shown in FIG. 5 except for an envelope detector circuit 51 which has an input coupled to the output of the RF amplifier circuit 33, as indicated by the solid arrow, or to the output of the VIF amplifier circuit 35, as indicated by the broken arrow. The envelope detector circuit 51 performs AM detection to convert the received data into amplitude data. The amplitude data are fed through a buffer circuit 52 to an RF level output terminal T5 for connection to the controller circuit 19.

What is claimed is:

1. In a television receiver arranged for receiving a full-digital television signal having digital data including digital video data and digital audio data, a channel selecting system comprising:

means for detecting a broadcasting carrier of the received television signal while changing a receive frequency to a receive frequency in a different frequency band; and means for making a check whether the digital data are locked in the vicinity of the receive frequency after the broadcasting carrier is detected.

2. The channel selecting system as claimed in claim 1, wherein the television receiver includes a tuner arranged to produce an automatic gain control signal, and wherein the detecting means includes means for checking the automatic gain control signal to detect the broadcasting carrier.

3. In a television receiver arranged for receiving a full-digital television signal having digital data including digital video data and digital audio data, a channel selecting system comprising:

means for detecting a broadcasting carrier of the received television signal while changing a receive frequency; and means for making a check whether the digital data are locked in the vicinity of the receive frequency after the broadcasting carrier is detected;

wherein the detecting means includes means for checking an RF level of the received television signal to detect the broadcasting carrier.

making a check whether the digital data are locked in the vicinity of the receive frequency after the broadcasting carrier is detected.

4. A method of receiving a full-digital television signal having digital data including digital video data and digital audio data in a television receiver having a channel selecting system, the method comprising the steps of:

detecting a broadcasting carrier of the received television signal while changing a receive frequency to a receive frequency in a different frequency band; and making a check whether the digital data are locked in the vicinity of the receive frequency after the broadcasting carrier is detected.

5. The method as claimed in claim 4, further comprising the steps of:

making a check whether the digital data are locked in the vicinity of the receive frequency after the broadcasting carrier is detected.

6. A method of receiving a full-digital television signal having digital data including digital video data and digital audio data in a television receiver having a channel selecting system, the method comprising the steps of:

detecting a broadcasting carrier of the received television signal while changing a receive frequency;

making a check whether the digital data are locked in the vicinity of the receive frequency after the broadcasting carrier is detected; and checking an RF level of the received television signal to detect the broadcasting carrier.

7. In a television receiver arranged for receiving a full-digital television signal having digital data including digital video data and digital audio data, a channel selecting system comprising:

means for selecting a receive frequency;

means for determining whether the receive frequency is within a frequency band where a broadcast carrier exists;

means for changing the receive frequency if the receive frequency is not within a frequency band where a broadcast carrier exists; and means for making a check whether the digital data are locked in the vicinity of the receive frequency after the determining means determines that the receive frequency is within a frequency band where a broadcast carrier exists.

8. The method as claimed in claim 4, further comprising the steps of:

producing, by a tuner in the television receiver, an automatic gain control signal; and checking the automatic gain control signal to detect the broadcasting carrier.

\* \* \* \* \*

UNITED STATES PATENT AND TRADEMARK OFFICE
CERTIFICATE OF CORRECTION

PATENT NO. : 5,598,228
DATED : January 28, 1997
INVENTOR(S) : MITSUMASA SAITOH

It is certified that error appears in the above-indentified patent and that said Letters Patent is hereby corrected as shown below:

In Col. 8, lines 4, please delete --making a check whether the digital data are locked in the vicinity of the receive frequency after the broadcasting carrier is detected.--

Signed and Sealed this

Twentieth Day of May, 1997

Attest:

BRUCE LEHMAN

Attesting Officer      Commissioner of Patents and Trademarks